(12) United States Patent
Jones

(10) Patent No.: US 6,372,052 B1
(45) Date of Patent: Apr. 16, 2002

(54) PORTABLE COMBUSTION-DRIVEN H.V.A.C. DUCT CLEANING SYSTEM

(76) Inventor: Edward A. Jones, 400 Grand St., Jersey City, NJ (US) 07302

( * ) Notice: Subject to any disclaimer, the term of this patent is extended or adjusted under 35 U.S.C. 154(b) by 0 days.

(21) Appl. No.: 09/241,986

(22) Filed: Feb. 2, 1999

Related U.S. Application Data

(63) Continuation-in-part of application No. 08/919,433, filed on Aug. 27, 1997, now Pat. No. 6,035,484, which is a continuation-in-part of application No. 08/290,540, filed on Aug. 15, 1994, now Pat. No. 5,724,701, which is a continuation-in-part of application No. 08/919,416, filed on Aug. 27, 1997, now Pat. No. 5,966,773, which is a continuation of application No. 08/290,540, filed on Aug. 15, 1994, now Pat. No. 5,724,701.

(51) Int. Cl.[7] .................................................. F23J 3/02
(52) U.S. Cl. ........................ 134/21; 15/304; 134/22.11
(58) Field of Search ............................... 15/304, 422.2, 15/395; 55/356, 372, 350.1, 521, 525; 96/414; 134/21, 22.11, 22.12

(56) References Cited

U.S. PATENT DOCUMENTS

| | | | | |
|---|---|---|---|---|
| 3,485,671 | A | * 12/1969 | Stephens | ...................... 15/304 |
| 4,198,726 | A | * 4/1980 | Powell, Jr. | .................. 15/312.2 |
| 4,336,627 | A | * 6/1982 | Bascus | .......................... 15/321 |
| 5,417,729 | A | * 5/1995 | Greenleaf, Sr. | .............. 55/356 |
| 5,591,244 | A | * 1/1997 | Vross et al. | ................... 55/356 |
| 5,853,441 | A | * 12/1998 | Groen et al. | ................... 55/356 |

* cited by examiner

Primary Examiner—Terrence R. Till
(74) Attorney, Agent, or Firm—Wolff & Samson

(57) ABSTRACT

A combustion driven, portable, HVAC duct cleaning system is provided wherein the components of the system are quickly and easily attachable and detachable and are mounted on cart means to allow for mobility of the system. The system includes ducting for attaching the system to ductwork to be cleaned, a primary filter for filtering large debris, a combustion driven blower for creating an airflow, and a secondary filter for final filtering of the air prior to release into the atmosphere. The primary filter includes a breach door for opening the filter to remove filtered material therefrom. The breach door may include a transparent panel for permitting one to view the interior thereof. Preferably, the primary filter includes a wire mesh cone, the point of which extends into the air flow to provide for the filtering of large objects. The blower is preferably a tube axial blower driven by means of a belt interconnected with a combustion engine for driving the impeller within the blower to create an airflow. Thereafter, the airflow can be exhausted into a filter such as an inflatable sleeve filter or a HEPA filter such as a HEPA trailer. In an alternate embodiment, the combustion driven blower may include twin impellers driven by separate combustion engines to increase the resistance to static pressure as would be measured by water column fit. The twin impellers are preferably counter rotational to straighten airflow through the blower and to boost resistance static pressure as would also be measured by water column lift.

17 Claims, 8 Drawing Sheets

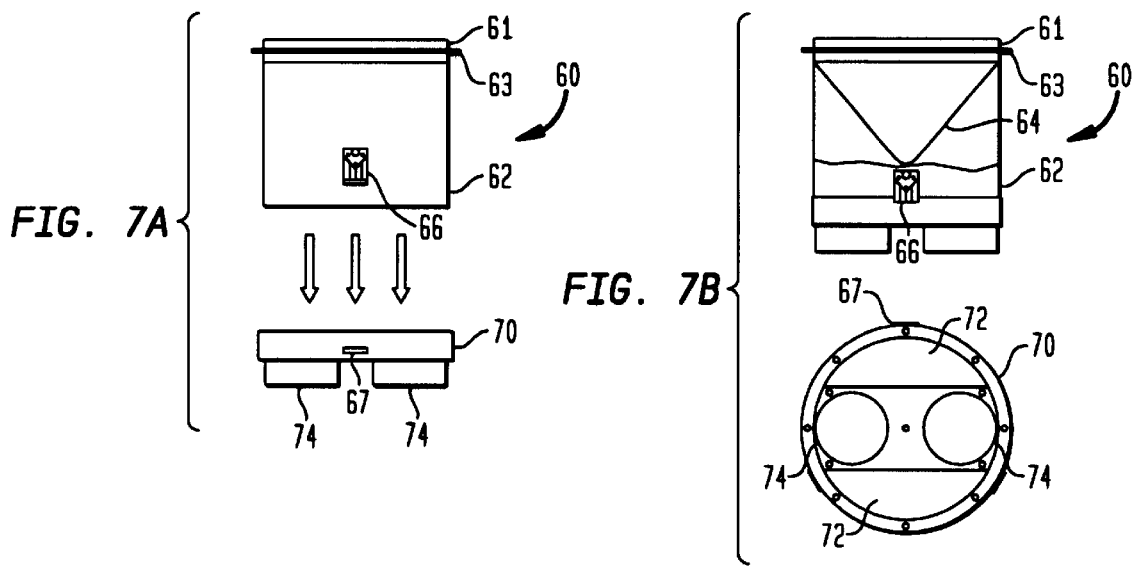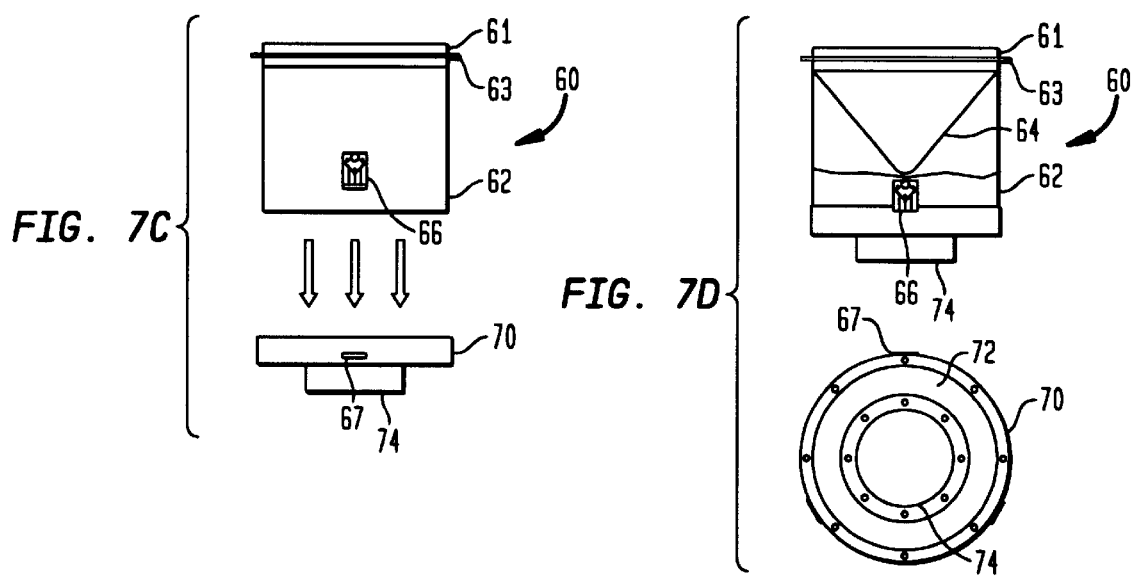

PORTABLE COMBUSTION-DRIVEN H.V.A.C. DUCT CLEANING SYSTEM

RELATED APPLICATIONS

This application is a continuation-in-part application of U.S. patent application Ser. No. 08/919,433, filed on Aug. 27, 1997 now U.S. Pat. No. 6,035,484, which is a continuation-in-part application of U.S. patent application Ser. No. 08/290,540, filed Aug. 15, 1994, now U.S. Pat. No. 5,724,701, issued Mar. 10, 1998. This application is also a continuation-in-part application of U.S. patent application Ser. No. 08/919,416, filed on Aug. 27, 1997 now U.S. Pat. No. 5,966,773, which is a continuation application of U.S. patent application Ser. No. 08/290,540, filed Aug. 15, 1994, now U.S. Pat. No. 5,724,701, issued Mar. 10, 1998.

BACKGROUND OF THE INVENTION

1. Field of the Invention

This invention generally relates to a system for cleaning H.V.A.C. ducts, and more specifically to a portable, combustion-driven blower system for cleaning H.V.A.C. ducts.

2. Related Art

It is common knowledge that when an H.V.A.C. system has been in use for a number of years, the ducts accumulate dirt, dust and various other contaminants which can be harmful to the individuals breathing air from such ducts. Many ducts are never cleaned and others are cleaned infrequently by antiquated methods.

The "sick" building syndrome is receiving considerable attention and the government is considering drafting clean air standards for buildings. Indoor air has found to be up to 70 times more polluted air than outdoor air according to the EPA. Also, 50% of all illnesses are caused or aggravated by polluted indoor air as reported by the American College of Allergists. A dirty heating, ventilation and air conditioning system is a prime cause of indoor air problems and illnesses.

Various apparatus do exist for scraping and vacuuming ducts, but no particular system has received widespread acceptance. Most ducts are never cleaned, particularly in households, and even where an attempt is made at cleaning, the job is slow, laborious and expensive.

The system of the present invention proposes a portable, yet powerful system which can be wheeled into position, interconnected with a commercial or residential H.V.A.C. duct system, and utilized to clean the ductwork more efficiently and at a lower cost than heretofore possible.

Previous efforts in this area include International Publication No. WO 85/02565 to Hinkanen, which discloses a device for cleaning ventilating duct systems comprising a brush for brushing debris off the interior of a duct, a suction pipe having an opening at the brush, a suction fan for creating a suction in the suction pipe, and a filter at the suction side of the fan to prevent the fan from getting dirty. A motor rotates both the brush and the suction fan. The suction fan is a centrifugal fan.

U.K. Patent Application No. 8,123,820 to Kullik, discloses a vacuum cleaner having a suction blower driven by an electric motor. The flow of air through the system is monitored by a transducer connected to a regulating circuit to adjust the motor speed to maintain the air flow strength through the vacuum in a self-regulating manner. The transducer comprises an air turbine, driven by the air flow in the apparatus, interconnected with a generator.

Powell, U.S. Patent No. 5,438,729, discloses an apparatus for cleaning air ducts comprising a motor driven fan for developing a vacuum for the suction of contaminants in the air from the interior of the ducts by forcing the contaminated air stream under positive pressure through filtration, which air is then discharged locally within the building.

Szabo, U.S. Pat. No. 3,381,328, discloses a vacuum cleaner inlet coupling and air regulator for a vacuum cleaner.

Weber, et al., U.S. Pat. No. 4,473,921, discloses a cleaning device for ducts comprising an instrument carrier having at least one working head movable along a feedback path through the interior of the duct. The instruments include retainable brushes mounted on the working head which can be pressed against the interior walls of the duct to be cleaned. An injector having a suction side is connected to a suction nozzle mounted on the working head for sucking in dirt and a dust collecting bag is provided downstream.

Walton, U.S. Pat. No. 5,072,487, discloses a duct cleaning apparatus having a pneumatically powered carriage sized to fit within a duct. Nozzle means is provided for directing cleaning and disinfecting fluids under pressure at the walls of the duct to clean and disinfect the duct.

Case, U.S. Pat. No. 3,484,890, discloses a pressure-vacuum cleaning and treating device to move air under positive pressure through a duct means and directed at a surface to be cleaned. The dirt is moved out of the system by negative pressure to a filter chamber and then the air is sent back to the blower for recirculation.

None of these previous efforts are thought to teach or suggest all of the elements of the present invention, nor do any disclose all of the benefits of the present invention.

OBJECTS AND SUMMARY OF THE INVENTION

It is a primary object of the present invention to provide a portable H.V.A.C. duct cleaning system.

It is an additional object of the present invention to provide a portable H.V.A.C. duct cleaning system which is combustion driven.

It is a further object of the present invention to provide a portable H.V.A.C. duct cleaning system which is combustion driven and fueled by liquefied natural gas (propane).

It is another object to the present invention to provide a portable, yet powerful, combustion-driven H.V.A.C. duct cleaning system.

It is even another object of the present invention to provide a portable, combustion-driven H.V.A.C. duct cleaning system wherein the blower and motor are operated from the exterior of a building.

It is even an additional object of the present invention to provide a portable, combustion-driven H.V.A.C. duct cleaning system wherein ducting is run from the H.V.A.C. system within a building to the exterior of a building where the ducting is interconnected with a combustion-driven blower.

It is an additional object of the present invention to provide a portable, combustion-driven H.V.A.C. duct cleaning system having a primary filter means for filtering air between the ducting and the blower.

It is still even an additional object of the present invention to provide a portable, combustion-driven H.V.A.C. duct cleaning system having a secondary filter after the blower to further filter the air.

It is still even an additional object of the present invention to provide a portable, combustion: driven H.V.A.C. duct cleaning system having a sleeve filter for the secondary filter.

It is still even an additional object of the present invention to provide a portable, combustion-driven H.V.A.C. duct cleaning system having a HEPA filter for the secondary filter.

It is an additional object of the present invention to provide a portable, combustion-driven H.V.A.C. duct cleaning system having a blower where the blower is a tube axial blower.

It is an additional object of the present invention to provide a portable, combustion-driven H.V.A.C. duct cleaning system having a blower where the blower is a vane axial blower.

It is even an additional object of the present invention to provide a portable, combustion-driven H.V.A.C. duct cleaning system having a blower comprising two impellers in series for increasing the water column lift of the blower.

It is still even an additional object of the present invention to provide a portable, combustion-driven H.V.A.C. duct cleaning system having a blower with twin impellers, each impeller being driven by a separate combustion engine.

It is still even a further object of the present invention to provide a portable, combustion-driven H.V.A.C. duct cleaning system having a blower comprising two counter rotational impellers.

A combustion driven, portable, HVAC duct cleaning system is provided wherein the components of the system are quickly and easily attachable and detachable and are mounted on cart means to allow for mobility of the system. The system includes ducting for attaching the system to ductwork to be cleaned, a primary filter for filtering large debris, a combustion driven blower for creating an airflow, and a secondary filter for final filtering of the air prior to release into the atmosphere. The primary filter includes a breach door for opening the filter to remove filtered material therefrom. The breach door may include a transparent panel for permitting one to view the interior thereof. Preferably, the primary filter includes a wire mesh cone, the point of which extends into the air flow to provide for the filtering of large objects. The blower is preferably a tube axial blower driven by means of a belt interconnected with a combustion engine for driving the impeller within the blower to create an airflow. Thereafter, the airflow can be exhausted into a filter such as an inflatable sleeve filter or a HEPA filter such as a HEPA trailer. In an alternate embodiment, the combustion driven blower may include twin impellers driven by separate combustion engines to increase the resistance to static pressure as would be measured by water column fit. The twin impellers are preferably counter rotational to straighten airflow through the blower and to boost resistance static pressure as would also be measured by water column lift.

BRIEF DESCRIPTION OF THE DRAWINGS

Other important objects and features of the invention will be apparent from the following Detailed Description of the Invention taken in connection with the accompanying drawings in which:

FIG. 7A is a partially exploded top plan view of the primary filter module and cover for the apparatus shown in FIG. 1A.

FIG. 7B is another view of the device shown in FIG. 7A with the filter module and the cover being partially cut away and the cover being rotated 90°.

FIG. 7C is another embodiment of the device shown in FIG. 7A.

FIG. 7D is another view of the device shown in FIG. 7C with the filter module and the cover being partially cut away and the cover being rotated 90°.

DETAILED DESCRIPTION OF THE INVENTION

Figure 1A:
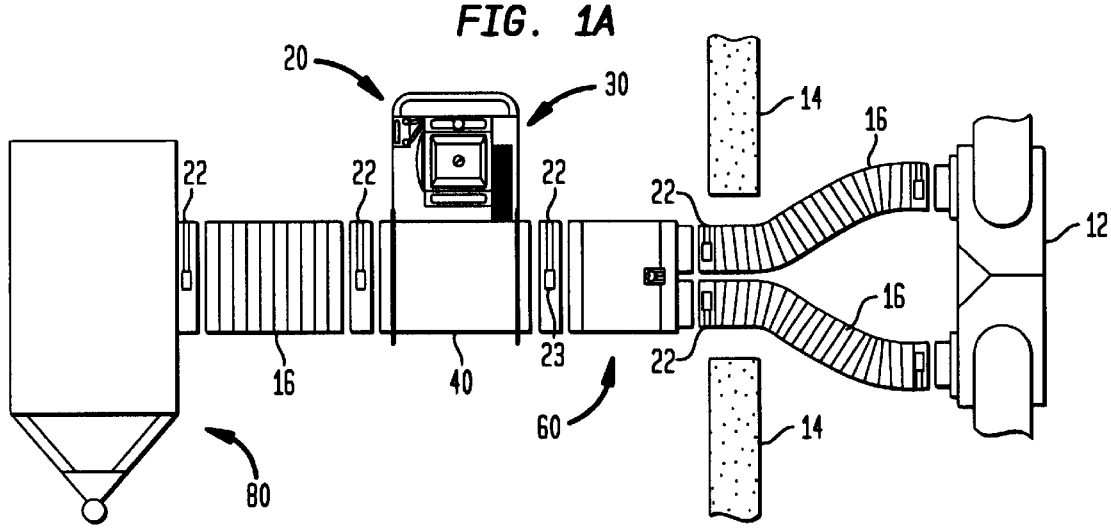
FIG. 1A is a top plan view of an embodiment of the portable, combustion-driven H.V.A.C. duct cleaning system of the present invention.
Figure 1B:
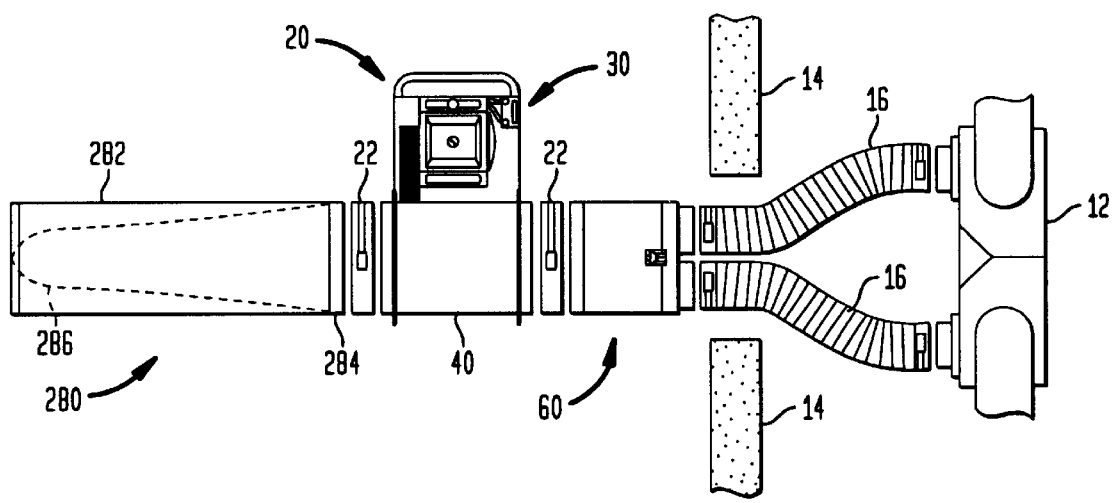
FIG. 1B is a top plan view of another embodiment of the invention shown in FIG. 1A.

As shown in FIG. 1A, the H.V.A.C. duct cleaning system of the present invention is generally indicated at 20. The system comprises a number of main components including a combustion driven blower 30, a primary filter 60, and a secondary filter 80. Another embodiment of the H.V.A.C. duct cleaning system 20 is shown in FIG. 1B wherein in alternative embodiment of the secondary filter 280 is utilized as part of the system.

The combustion driven blower, generally indicated at 30, is shown in more detail in FIGS. 3A, 3B, 3C, 3D and 3E. The combustion driven blower 30 includes a combustion engine 34 having a drive shaft 36 extending therefrom. A drive wheel 38 is mounted on the drive shaft 36. The combustion engine 34 drives the drive shaft 36 to drive the drive wheel 38. The combustion engine 34 is electrically started by a battery 32 interconnected with the combustion engine 34.

The combustion driven blower 30 additionally includes a blower 40 which comprises an impeller 42 mounted on axle 44. Also interconnected with axle 44 is driven gear 46. A belt 48 is interconnected between the drive wheel 38 of the combustion engine 34 and the driven gear 46 of the blower 40 such that the rotational motion of the drive wheel 38 is translated to the impeller 42.

The combustion driven blower 30, including the combustion engine 34, the battery 32 and the blower 40, is mounted on a cart 50 which includes a handle 52 and wheels 54. The cart 50 allows for the portability of the combustion driven blower. Drive belt 48 preferably comprises a tooth belt which co-acts with teeth on the drive wheel 38 and on the driven gear 46. Tension on the belt can be manually adjusted by means of a tensioning device or idler (not shown).

Figure 5:
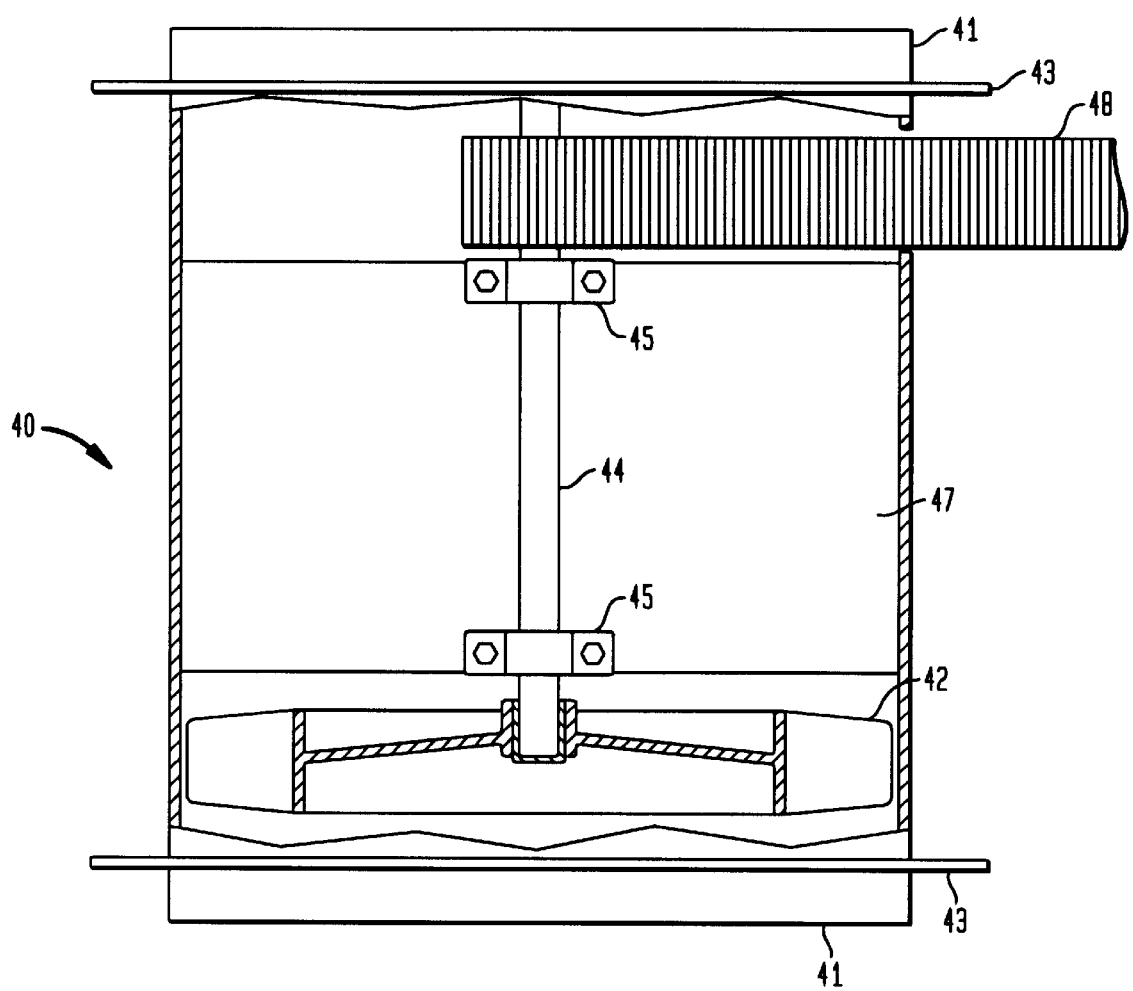
FIG. 5 is a partially cut away view of the blower shown in FIG. 3A.

Referring to FIG. 5, a top, partially cutaway view of blower 40 shows the impeller 42 mounted within the blower 40. The impeller 42 is mounted on axle 44 which is held in place by axle mounts 45. The axle mounts 45 are interconnected with pillow block 47 which holds the axle and allows for rotation thereof.

Blower 40 includes connection ends 41 at either end thereof to allow for interconnection of the blower 40 to the remainder of the system as will be hereinafter discussed. Additionally, connection flanges 43 are positioned just within connection ends 41 to properly position ducting and/or couplers for interconnecting components of the system with the blower 40.

The blower 40 can be a centrifugal blower fan or, preferably, a tube axial blower. The tube axial blower comprises a tube having first and second ends for allowing air to flow therethrough. The impeller 42 is positioned within the tube and within the air flow. As is known in the air movement art, and as is set forth in the Standards Handbook, Publication 99–86, by Air Movement and Control Association, Inc. (AMCA), a tube axial blower is "an axial fan without guide vanes." An axial fan is defined in the same publication as "a fan in which the airflow through the impeller is predominantly parallel to the axis of rotation. The impeller is contained in a cylindrical housing." The tube axial blower should be distinguished from a centrifugal fan which is defined as "a fan in which the airflow through the impeller is primarily axial upon entering the impeller and is changed by the impeller blades to an essentially radial flow at the impeller's discharge." It should also be noted that a vane axial blower is a preferred blower for use with the present invention. The blade can be a variable pitch blade and can include turning vanes on the outflow of the impeller to effect the properties of the blower 40.

As shown in FIGS. 1A and 1B, primary filter 60 is interconnected with the intake of the combustion driven blower 30. The primary filter includes a connection end 61 for connection of the filter to the other components of the system and a connection flange 63 which serves to define the connection end 61. The primary filter 60 can be interconnected with the blower 40 in any manner known in the art. A preferred method of interconnecting the primary filter 60 and the blower 40 is by means of a expandable ring coupler 22, which comprises an expandable, cylindrical ring, the size of which can be moved from a enlarged open position to a closed engaged position by moving a handle 23. In operation, the edges of items to be connected, such as the primary filter 60 and the blower 40, are placed in abutting relationship, the expandable ring coupler is placed thereabout in an open position, and the handle 23 is actuated to close the expandable ring to securely grab the edges of the primary filter 60 and the blower 40 to retain same in an abutting relationship. It should be noted that the expandable ring coupler 22 can be sized in accordance with the ducting for which it is to be used. Accordingly, the expandable ring coupler 22 can be used to interconnect the primary filter 60 with extension ducting 16 as will be hereinafter described. It should also be noted that the components of the system such as the combustion driven blower 30 and the primary filter 60 can be interconnected with each other directly by means of an expandable ring coupler or indirectly by a length of ducting interconnected with one end with an expandable ring coupler to the primary filter and interconnected at the other end by an expandable ring to the combustion driven blower 30. Alternatively, any other type of coupling mechanism may be used.

Referring to FIGS. 7A, 7B, 7C and 7D, the primary filter 60 includes a body 62 and a breach door 70. The body 62 houses the filter and the breach door 70 is interconnected with the body 62 by means of male latch member 66 and female latch member 67. As shown in FIG. 7A and 7B, the breach door 70 may contain two input tubes 74 or, as shown in FIG. 7C and 7D, the breach door 70 may include one input tube 74. The breach door 70 also includes one or more transparent viewing panels 72, preferably made of Lexan, a registered trademark of General Electric Company so that the condition of the interior of the primary filters 60 can be visually inspected.

Within the body 62 of the primary filter 60 is a cone-shaped wire mesh, preferably made of stainless steel. The point of the cone is directed into the airstream. In operation, the airstream is directed at and through the filter screen 64. The primary filter 60 filters out large objects to prevent same from damaging any part of the system downstream therefrom.

Although it is very preferable that the combustion driven blower is positioned outside a building that houses the ductwork to be cleaned, the primary filter 60 can be positioned either within or exterior of the wall 14 of such building. The primary filter 60 is interconnected with the ductwork 12 within the building by means of ducting 16. This connection can be provided by a single piece of ducting that can be interconnected with the ductwork 12 within the building in any means known in the art at one end and interconnected with a breach door 70 shown in FIGS. 7C and 7D. Alternatively, two lengths of ducting 16 can be interconnected with the ductwork 12 and interconnected with a breach door 70 on the primary filter as shown in FIGS. 7A and 7B. In such an arrangement wherein two pieces of ducting 16 are utilized, one can be interconnected with the feed of the ductwork 12 and the other can be interconnected with the return on the ductwork 12 to pull from both ends of the system. Importantly, the ducting can be sized in accordance with the desires of the person utilizing the system. For example, the ducting 16 could be standard ten inch ducting or, alternatively, could be larger fourteen inch ducting if one wants to move a lot of air. Appropriately-sized couplers can be used to interconnect the ducting 16 with the primary filter 60 and with the ductwork 12.

Figure 8A:
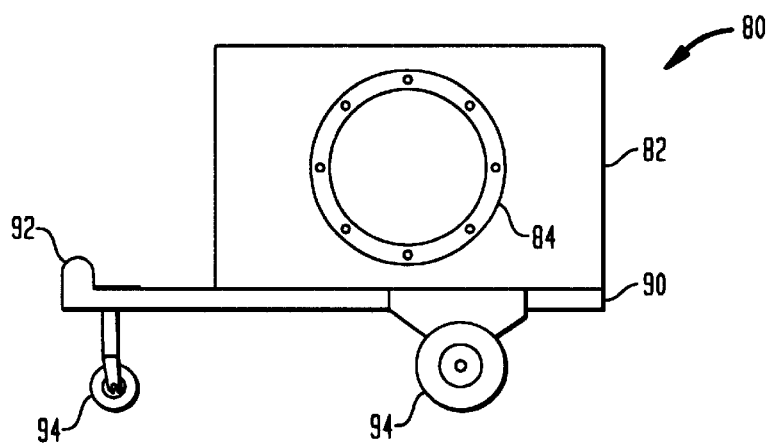
FIG. 8A is a side plan view of the secondary filter module for the apparatus shown in FIG. 1A.
Figure 8B:
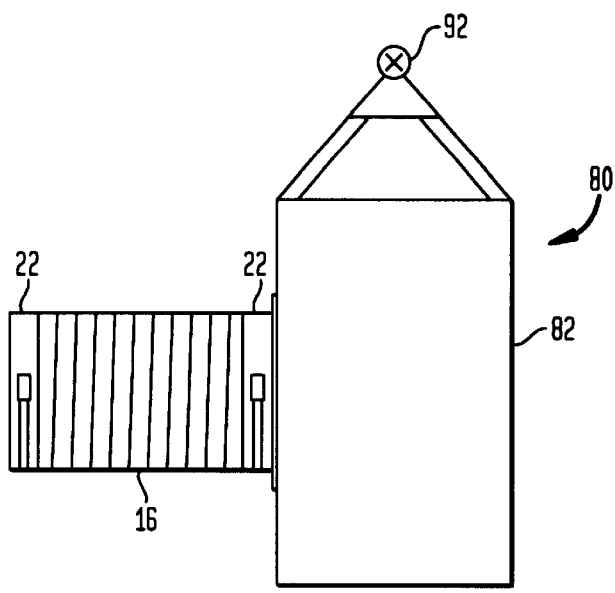
FIG. 8B is a top plan view of the device shown in FIG. 8A.
Figure 8C:
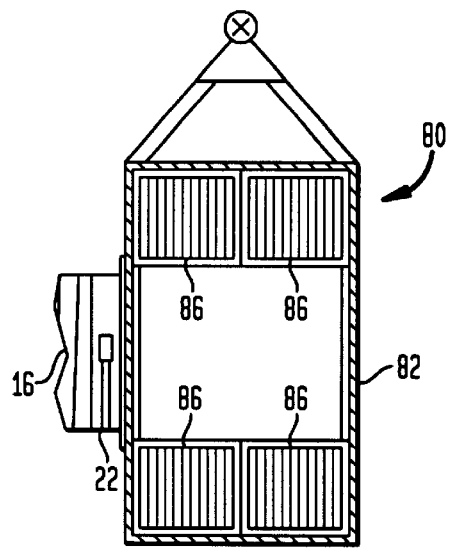
FIG. 8C is a partially exploded view of the device shown in FIG. 8B.

After the combustion driven blower 30 pulls air from the ductwork 12 and through the primary filter 60 and through the blower 40, the air is then directed to a secondary filter. As shown in FIG. 1A, the secondary filter 80 could be a HEPA filter or, as shown in FIG. 1B, the secondary filter 80 could be a sleeve filter. With respect to the HEPA filter 80, such a filter can be mounted on a cart 90 having a hitch 92 and wheels 94. As shown in FIGS. 8A, 8B and 8C, the filter 80 includes a housing 82 having a cylindrical flange 84 attached about an aperture extending into the housing 82. The flange 84 can be utilized to interconnect the secondary filter 80 with the blower 40 either directly with a coupler or by means of ducting 16 attached at one end to the secondary filter 80 and at the other end to blower 40. Housed within the housing 82 are HEPA filters 86. The HEPA filters are generally approximately 90% efficient. Importantly, by positioning the HEPA filters in a housing 82 on a trailer cart 90, the mobility is added to the system.

As shown in FIG. 1B, the secondary filter 280 could be a sleeve filter comprising a cylindrical housing having an connection end 284 for attachment to ducting and/or to the blower 40. Mounted within the cylindrical housing 282 is exhaust sleeve 286. The exhaust sleeve 286 can be made of any filter-type material such as a 4-ply or 2-ply media that can be used for filtration. Importantly, the cylindrical body 282 can be of a rigid construction or, alternatively, can be made of a flexible material which, on positive pressure, inflates itself during operation of the system. It has been determined that with 500 CFM per square foot of media, the secondary filter sleeve 280 is 90% efficient. One material that the exhaust sleeve 286 can be formed out of is ballistic nylon. The exhaust sleeve 286 within the cylindrical housing 282 is any standard filter media such as a 4-ply or 2-ply material that is commercially available.

Figure 2:
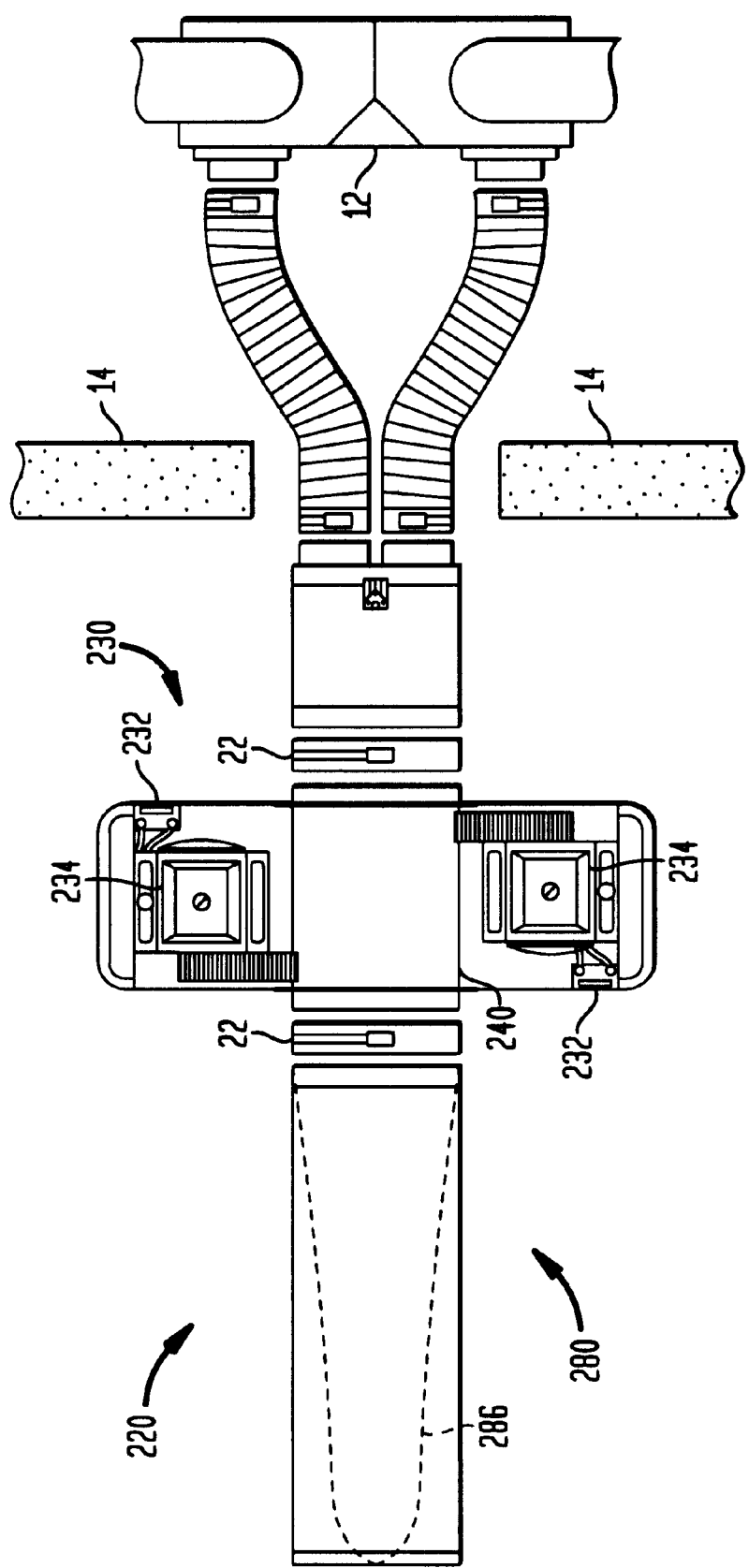
FIG. 2 is a top plan view of another embodiment of the invention shown in FIG. 1A having two combustion engines.
Figure 3:
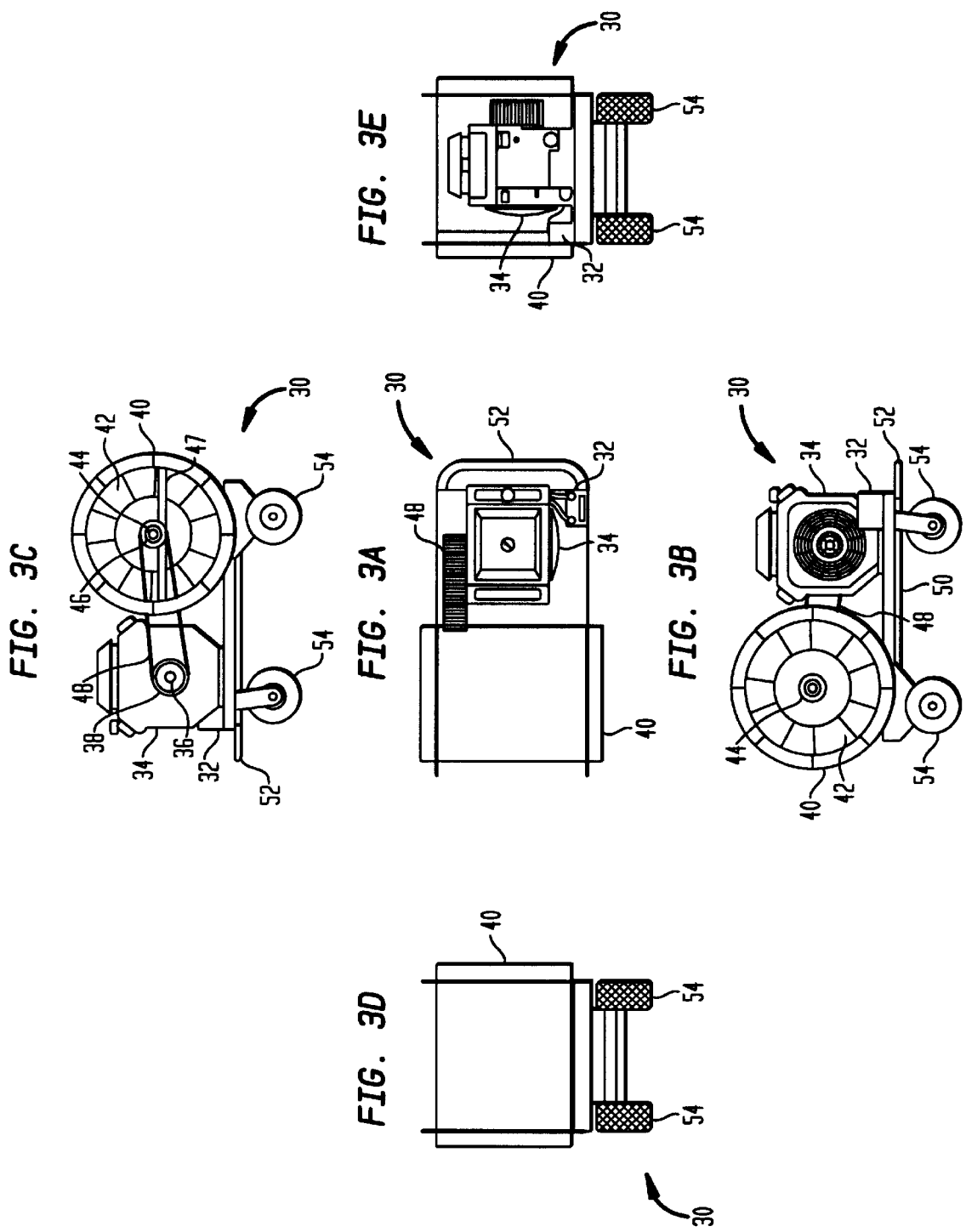
FIG. 3A is a top plan view of a portion of the device shown in FIGS. 1A and 1B showing the combustion engine and blower positioned on a cart in accordance with the present invention.
FIG. 3B is a left side view of the device shown in FIG. 3A.
FIG. 3C is a right side view of the device shown in FIG. 3A.
FIG. 3D is a rear side view of the device shown in FIG. 3A.
FIG. 3E is a front side view of the device shown in FIG. 3A.
Figure 4:
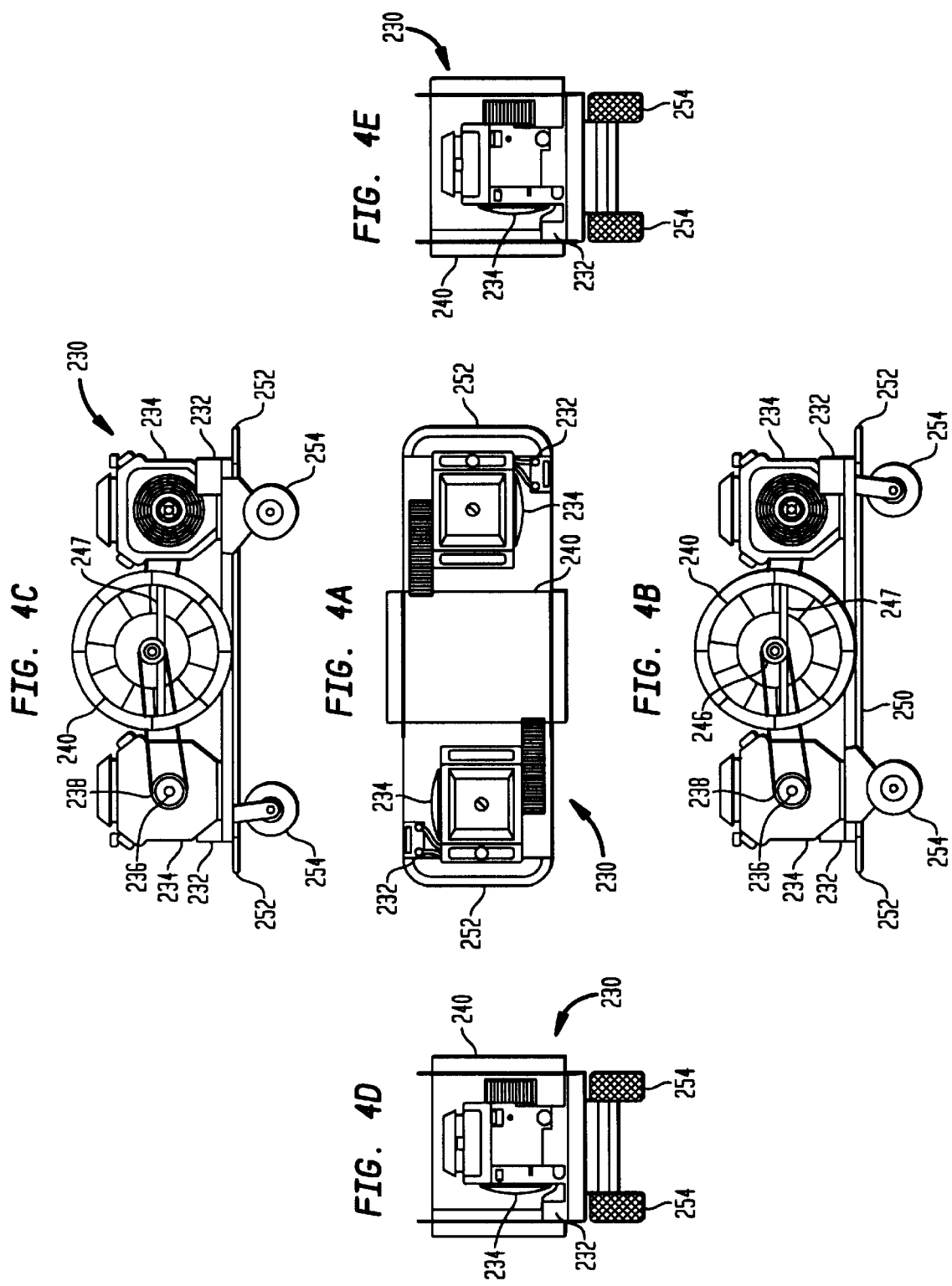
FIG. 4A is a top plan view of a portion of the device shown in of FIG. 2 showing two combustion engines and twin impeller blades on a cart in accordance with the present invention.
FIG. 4B is a left side view of the device shown in FIG. 4A.
FIG. 4C is a right side view of the device shown in FIG. 4A.
FIG. 4D is a rear side view of the device shown in FIG. 4A.
FIG. 4E is a front side view of the device shown in FIG. 4A.

Referring now to FIG. 2, an alternate embodiment of the H.V.A.C. duct cleaning system, generally indicated at 220, of the present invention generally indicated at 220, having a combustion driven blower 230 which includes two combustion engines 234, is shown. Each combustion engine 234 includes a battery 232 for starting same. As can be seen in FIGS. 4A, 4B, 4C, 4D, and 4E, each combustion engine 234 includes a drive shaft 236 extending therefrom. A drive wheel 238 is mounted on each of drive shafts 236. The combustion engines 234 each drive shafts 236 which drive the drive wheels 238.

Figure 6:
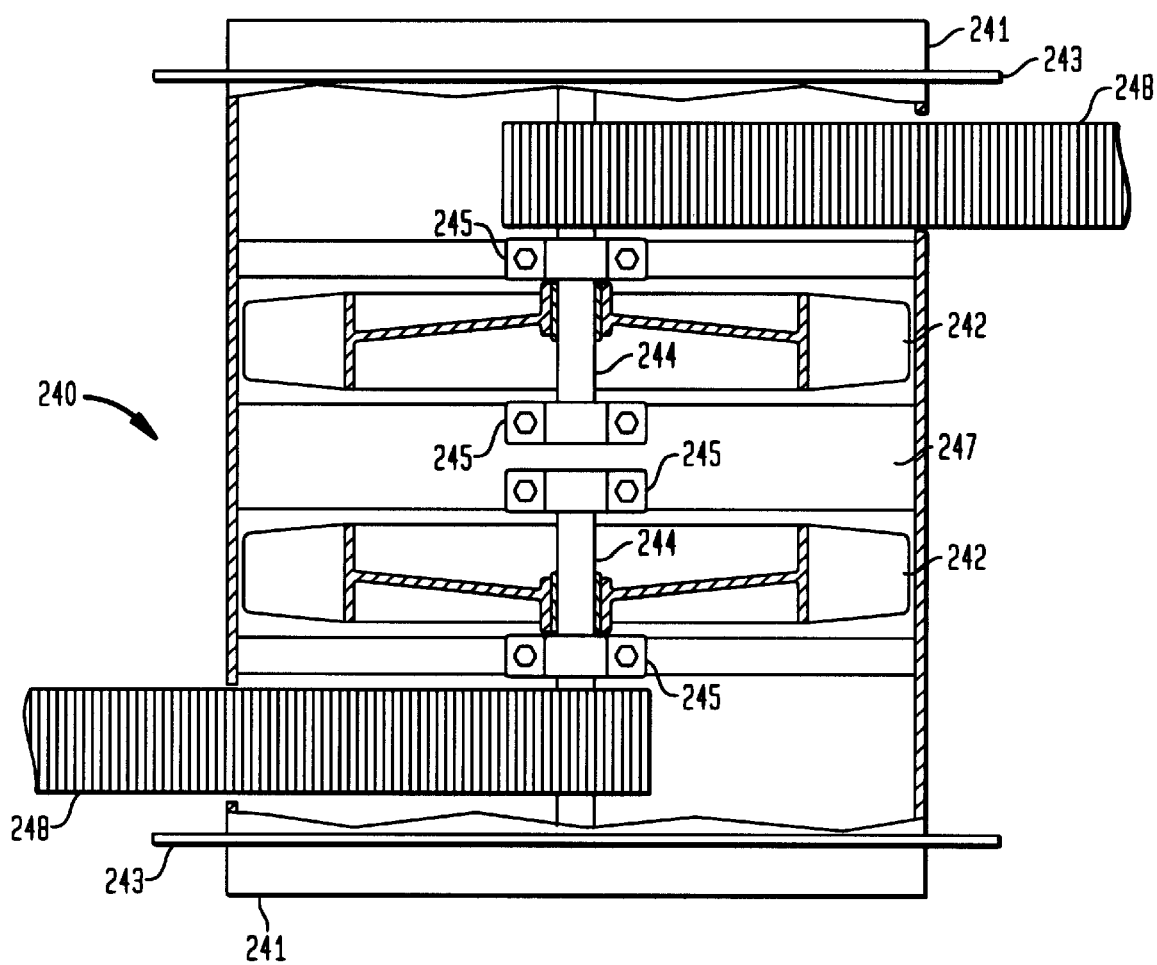
FIG. 6 is a partially cut away view of the blower with two impellers shown in FIG. 4A.

The combustion driver blower 230 additionally includes a blower 240 as shown in FIG. 6. The blower 240 comprises two impellers 242 mounted on axles 244. Interconnected with the axles 244 are driven gears 246. Belts 248 interconnected between the drive wheels 238 of the combustion engines 234 and the driven gear 246 of the blowers 240 are such that the rotational motion of the drive wheels 238 are translated to the impellers 242. Drive belts 248 preferably comprises tooth belts which coact with teeth on the driven gears 246. Tension on the belts 248 can be manually adjusted by means of tensioning devices (not shown).

Both impellers 242 are mounted within the blower 240. The impellers 242 are mounted on axles 244 which are held in place by axle mounts 245 which are interconnected with pillow block 247 to hold the axle and allow for the rotation thereof.

Blower 240 includes connection ends 241 at either end thereof to allow for interconnection of the blower 240 with the remainder of the system. Additionally, connection flanges 243 are positioned just within the connection ends 241 to properly position ducting and/or couplers for interconnecting the blower 240 with the other components of the system.

By using the dual combustion engines 234 along with twin impellers 242 the CFM is increased, i.e. the water column lift is effectively doubled. Preferably, the twin impellers 242 are counter rotational, i.e. one is going clockwise and the other is going counterclockwise. This tends to straighten the air flow and boosts the resistance to water column lift.

As with the other components of the present invention and the other embodiments, the dual combustion driven blowers 230 are positioned on a cart 250 having handles 252 and wheels 254 to allow for the mobility of the equipment.

The combustion driven HVAC duct cleaning system of the present invention can be utilized not only to clean duct systems but also to move large amount of air in a short period of time. Accordingly, the invention can be used to evacuate smoke from a burning building or evacuate dust from a construction site, etc.

Having thus described the invention in detail, it is to be understood that the foregoing description is not intended to limit the spirit and scope thereof. What is desired to be protected by Letters Patent is set forth in the appended claims.

What is claimed is:

1. A combustion driven H.V.A.C. duct cleaning apparatus comprising:

axial blower means for creating an airflow, the axial blower means having a driven gear;

combustion engine means for driving the axial blower means, the combustion engine means including a drive shaft carrying a drive wheel;

belt means interconnecting the drive wheel of the combustion engine means with the driven gear of the axial blower means; and ducting means for interconnecting the axial blower means with H.V.A.C. ducting to be cleaned.

2. The apparatus of claim 1 wherein the axial blower means and the combustion engine means are each mounted on their own separate cart means.

3. The apparatus of claim 2 further comprising electric battery means for starting the combustion engine means.

4. The apparatus of claim 3 wherein the electric battery means is mounted on the cart means.

5. The apparatus of claim 1 further comprising second filter means for filtering the airflow leaving the blower means.

6. An H.V.A.C. duct cleaning system comprising:

axial blower means having an inlet, an exhaust, and an impeller;

combustion engine means interconnected with the axial blower means for driving the impeller;

primary filter means interconnected with the inlet of the axial blower means;

secondary filter means interconnected with the exhaust of the axial blower means;

cart means for supporting the axial blower means and the combustion engine means; and ducting means for interconnecting the primary filter means with an H.V.A.C. duct to be cleaned.

7. The apparatus of claim 6 wherein the axial blower means and the combustion engine means are positioned remotely at an exterior of a building to be cleaned and the ducting means extends into a building to be cleaned.

8. An apparatus for cleaning an H.V.A.C. duct system comprising:

an axial blower for creating an air flow, the axial blower positioned exterior to a building housing on H.V.A.C. duct to be cleaned;

a combustion engine for driving the axial blower, the combustion engine positioned exterior to a building housing on H.V.A.C. duct to be cleaned;

a filter interconnected with the axial blower for filtering the air flow; and ducting means for connecting the axial blower to an H.V.A.C. duct system at a location from which air is to be removed and an H.V.A.C. duct system is to be cleaned, the ducting means sized to interconnect an H.V.A.C. duct within a building to the axial blower positioned exterior of the building.

9. The apparatus of claim 8 wherein the axial blower comprises a tube axial blower.

10. The apparatus of claim 8 wherein the axial blower comprises a vane axial blower.

11. The apparatus of claim 8 wherein the filter means comprises a first filter comprising a cone shaped wire mesh filter pointed into the air flow.

12. The apparatus of claim 8 wherein the filter means comprises a first filter comprising wire mesh and the filter means includes a view door.

13. The apparatus of claim 8 wherein the filter means comprises a first filter comprising wire mesh and a second filter interconnected with an exhaust of the axial blower.

14. The apparatus of claim 13 wherein the second filter HEPA provides filtering.

15. The apparatus of claim 13 wherein the second filter comprises a sleeve filter.

16. A method of cleaning an H.V.A.C. duct comprising:

providing a blower having an intake and an exhaust, and combustion drive engine on a portable cart;

positioning the portable cart exterior of a building;

interconnecting a primary filter with the intake of the blower;

interconnecting ducting with an H.V.A.C. duct to be cleaned;

extending the ducting from within a building having an H.V.A.C. duct to be cleaned;

interconnecting the ducting with the primary filter;

providing a secondary filter on a portable filter;

positioning the portable trailer near the portable cart and attaching the secondary filter to the exhaust of the blower; and starting the combustion drive engine to drive the blower to create an air flow from an H.V.A.C. duct to be cleaned, through the ducting means, the primary filter and the blower to clean an H.V.A.C. duct.

17. The method of claim 16 wherein the primary filter comprises two inlets and the method of cleaning an H.V.A.C. duct further comprises attaching first ducting from a feed of an H.V.A.C. duct to one inlet and attaching second ducting from a return of an H.V.A.C. duct to the other inlet.

* * * * *